E. H. BRISTOL.
PLANIMETER.
APPLICATION FILED JULY 26, 1915.
1,314,463.
Patented Aug. 26, 1919.
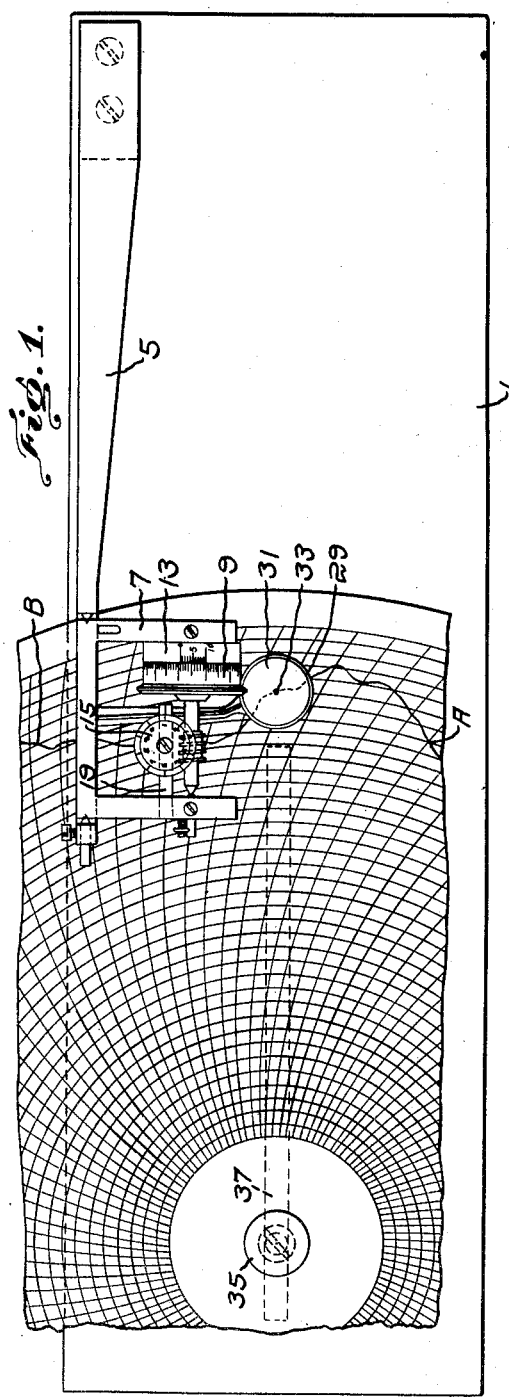
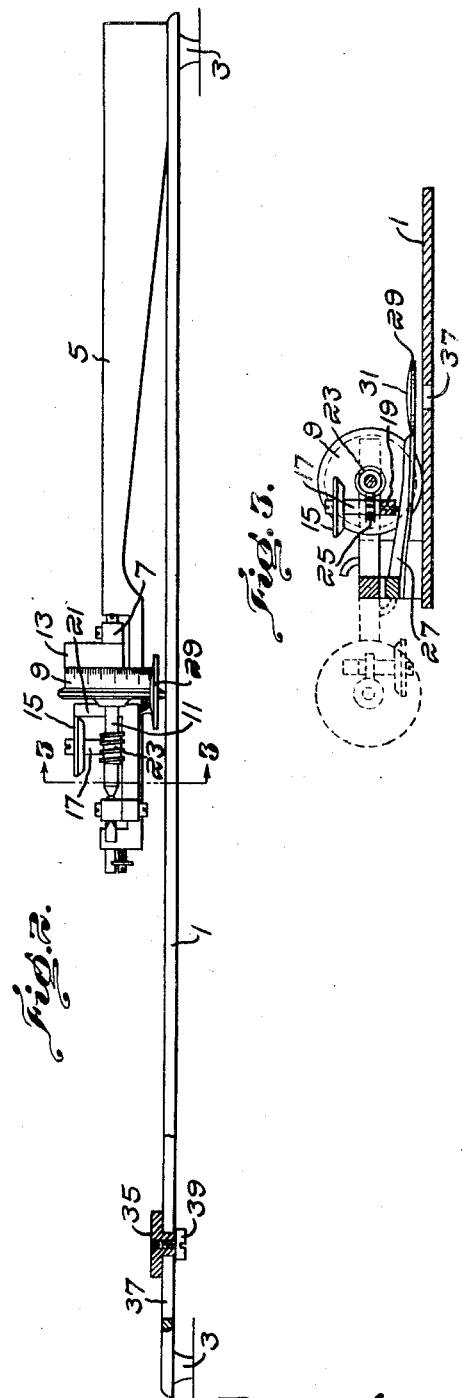
Witnesses:
Ernest A. Telfer
Carl L. Choate.
Inventor.
Edgar H. Bristol,

UNITED STATES PATENT OFFICE.

EDGAR H. BRISTOL, OF FOXBORO, MASSACHUSETTS, ASSIGNOR TO THE FOXBORO COMPANY, OF FOXBORO, MASSACHUSETTS, A CORPORATION OF MASSACHUSETTS.

PLANIMETER.

1,314,463.  Specification of Letters Patent.  Patented Aug. 26, 1919.

Application filed July 26, 1915. Serial No. 41,854.

*To all whom it may concern:*

Be it known that I, EDGAR H. BRISTOL, a citizen of the United States, and a resident of Foxboro, Massachusetts, have invented an Improvement in Planimeters, of which the following description, in connection with the accompanying drawings, is a specification, like characters on the drawings representing like parts.

This invention relates to an apparatus to be used in reading, interpreting or otherwise procuring information from chart records and the like, as for example chart records of recording pressure gages, temperature gages, pyrometers or other instruments.

Among other objects the invention is intended to provide means for ascertaining average pressures, temperatures or the like from records indicating variations in pressure temperature or the like during given periods of time. The invention is not limited in its scope of application to records from any particular species of instrument. On the contrary, as will appear to those skilled in the art, the invention has wide adaptability to a great variety of uses.

The character of the invention may be best understood by reference to the illustrative embodiment thereof shown in the accompanying drawing, wherein:

Figure 1 is a plan of an illustrative planimeter shown herein as embodying the invention;

Fig. 2 is a view partly in side elevation and partly in section of the planimeter shown in Fig. 1; and Fig. 3 is a vertical transverse section taken on line 3—3 of Fig. 2.

Referring to the drawing, the illustrative planimeter shown therein as embodying the invention comprises an elongated plate 1 of brass or other appropriate material provided with feet 3 adjacent the corners thereof to support the plate a short distance from the table or other support upon which it is placed in use. To support the measuring mechanism of the apparatus there is provided an arm 5 having one end fast to the upper surface of said plate adjacent one corner thereof. This arm extends parallel to an edge of said plate toward a point substantially midway between its ends and is formed to leave a space between the free end portion of said arm and said plate to permit the insertion of a chart therebetween, as more fully hereinafter described. The free end of said arm is recessed to receive a U-shaped rocking frame 7 having a needle fulcrum connection with said arm and projecting laterally therefrom toward the center of the plate. On this frame is mounted a measuring wheel 9 graduated into linear or other appropriate units. This wheel is fast on a shaft 11 journaled in bearings in said frame. A vernier plate 13 is secured to said frame and may be read in connection with the measuring wheel in the usual manner.

To register complete rotations of said wheel a counter wheel 15 is provided fast on a vertical shaft 17 journaled in a bracket 19 carried by the rocking frame 7. This bracket has a post 21 projecting upward therefrom in registration with the face of the counter wheel and is provided with an index mark for determining the reading of said wheel. To rotate the counter wheel from the measuring wheel the shaft of the latter is provided with a worm 23 fast on its shaft and meshing with a worm wheel 25 fast on the shaft of the counter wheel.

An important feature of the invention relates to an improved tracer. As shown herein this tracer is in the form of a finger 27 having one end fast to the arm 5 referred to and the opposite end formed to present a ring or rim 29 for receiving a disk 31 of glass or other appropriate transparent material. On the center of this glass is a dot 33 indelibly or permanently marked thereon and serving as the tracer point for following the record line on the chart, as more fully hereinafter described. It will be observed that the tracer finger 27 extends downwardly somewhat from the arm 5 to present the glass disk closely adjacent to the top of the plate 1 but spaced therefrom sufficiently to permit the passage of the chart therebetween.

A fragmentary diagram of a chart is shown in Fig. 1 plotted in polar coördinates. The lines extending in a general radial direction on said chart coincide with the path of movement of the index which is frequently used in recording instruments. The radial graduations may be marked to represent increments of time and the circumferential graduations may be marked to represent increments of pressure, temperature or other units. The chart shown herein has a central aperture intended to fit the clock driven spindle of a recording instrument. To position the chart on the plate 1 there is provided a button 35 having a shank inserted through an elongated slot 37 in said plate. To hold the button in said slot it is provided with a screw 39 having a head somewhat larger than the shank thereof. The button may be of a size to fit the central aperture in the chart. When the chart is placed on the plate with its aperture over said button the chart is susceptible of movement longitudinally of the plate as guided by said button and slot and of rotative movement about the axis of the button.

Heretofore, so far as I am aware, in planimeters it has been the custom to stationarily position the chart and cause the tracer and measuring mechanism to travel over the chart. In accordance with the planimeter shown herein the tracer and measuring mechanism are held stationary and the chart is moved to cause the tracer point of the glass disk to follow the record line on the chart. This is a very desirable feature since the tracer presents an isolated point permitting an unobstructed visualization of a substantial portion of the chart adjacent the index points. As a result, a substantial portion of the record line in advance of said point may readily be seen and the chart may be moved to cause the record line thereon faithfully to follow said point with accuracy and ease. This operation is further facilitated by virtue of the fact that the large surface of the chart is available to be conveniently engaged by the hand or by a rubber or other friction device held in the hand thereby permitting a positive and accurate control thereof.

In use the chart is placed on the plate 1 and then the frame 7 is rocked from its inactive position shown in dotted lines in Fig. 3 to its active position shown in full lines in said figure with the wheel resting on and supported by the record sheet. Then the chart is slid over the plate with a combined movement of translation and rotation, or one of them as necessary, causing thereby, for example, the record line A—B to pass to and beneath the tracer point 33 in all of its meanderings from the point A to the point B. Then the reading of the measuring wheel and the average radius of said lines A—B is determined in a manner well known to those skilled in the art and unnecessary to be described herein.

By my invention there is provided a simple and effective apparatus whereby a chart may be quickly and readily placed on the plate and may be quickly and accurately moved thereon to measure the record. It is not necessary to position the measuring mechanism relatively to a table and record since this is already obtained by the fixed relation between the mechanism and plate. Also it is not necessary to provide a flat smooth surface to receive and support the record sheet while it is being measured since this is supplied in the plate forming a part of the instrument.

While the invention is described herein as adapted for obtaining the average radius of charts marked with polar coördinates, it will be understood it may be used for making any other measurements within the field of use of planimeters.

Having described one illustrative embodiment of the invention without limiting the same thereto, what I claim as new and desire to secure by Letters Patent, is:

1. An instrument of the class described comprising in combination, a record sheet support, a tracer secured in fixed position support, a tracer secured in fixed position relatively thereto, and means for measuring relative movement between a sheet and said tracer, said elements being formed and relatively placed to permit combined rotative and translative movement of a sheet on the face of said support and beneath said tracer.

2. An instrument of the class described comprising in combination, a record sheet support, a tracer fixed thereon, a measuring mechanism carried by said support and adapted to operate on relative movement between the same and the record sheet, and means for guiding a record sheet over said support beneath said tracer.

3. An instrument of the class described comprising in combination, a record sheet support having a guideway therein, a record sheet receiving member adapted to move along said guideway, a tracer finger mounted on said support, and a mechanism for measuring the movement of said sheet relative to the tracer finger.

4. An instrument of the class described comprising in combination, a record sheet support, an arm mounted thereon, a finger projecting from said arm, a transparent element carried by said finger, a tracer mark on said element for following the record on said sheet and means for measuring movement of the sheet relative to said mark.

5. An instrument of the class described comprising in combination, a record sheet support, an arm fast thereon, a finger projecting from said arm having a rim thereon, a glass element mounted in said rim, a tracer mark on said element for following the record on said sheet and means for measuring movement of the sheet relative to said mark.

6. An instrument of the class described comprising in combination, a measuring mechanism including a wheel for rotation relatively to a record sheet, and a tracer comprising a transparent element having a mark thereon for following the record on said sheet.

7. An instrument of the class described comprising in combination, a measuring mechanism including a measuring wheel for rotation relative to a record sheet and a tracer comprising a transpicuous element presenting an index point for following the record on said sheet, and supporting means for said element.

8. An instrument of the class described comprising in combination, a record sheet supporting plate, a transpicuous element presenting an index point for following the record on said sheet, means supporting said element on said plate and means for measuring movement of the sheet relative to said mark.

9. An instrument of the class described comprising in combination, a record sheet supporting plate having a slot therein, a record sheet guiding button adapted to slide in said slot, an arm fast on said plate and having a free end spaced therefrom, a frame pivotally mounted on said arm, a measuring wheel carried by said frame, and a transparent element carried by said arm having a tracer point for following the record on said sheet.

10. An instrument of the class described comprising in combination, a record sheet support, a rocking frame mounted thereon, a measuring mechanism carried by said frame including a wheel adapted to rotate along said sheet, and a transparent element mounted on said support and having a tracer point for following the record on said sheet.

11. An instrument of the class described comprising in combination, a record sheet supporting plate, a rocking frame supported adjacent said plate, a measuring mechanism mounted on said frame for engagement with said sheet, a transparent element having a point thereon for following the record on said sheet, means connecting said element with said support, and means for guiding said sheet over said support.

12. An instrument of the class described comprising in combination, a record sheet supporting plate 1, a rocking frame 7 mounted thereon, a measuring wheel 9 carried by said frame, and a transparent element 31 mounted on said plate and having a tracing point 33 for following the record line on said sheet.

13. An instrument of the class described comprising in combination, a record sheet supporting plate 1 having a slot 37 therein, a record sheet receiving element 35 adapted to be guided by said slot, a measuring wheel 9, and a transparent element 31 having a tracing point 33 for following the record on said sheet.

14. In an instrument of the class described in combination, a measuring mechanism having a portion adapted to contact with a record sheet and adapted to measure relative movement of said portion and sheet, and a tracer mounted at a fixed distance from said portion and comprising a transpicuous element presenting an index point to facilitate relative guiding of the mechanism and sheet.

15. An instrument of the class described comprising record-sheet support, a measuring device and a tracer fixed relatively thereto and guide means to enable the operator to maintain a point of said sheet in unchanged direction relative to but at a variable distance from said tracer while permitting said sheet to rotate about said point.

In testimony whereof, I have signed my name to this specification in the presence of two subscribing witnesses.

EDGAR H. BRISTOL.

Witnesses:
EVERETT I. EMERY,
HENRY T. WILLIAMS.